United States Patent
De Bruin et al.

(10) Patent No.: US 9,403,533 B2
(45) Date of Patent: Aug. 2, 2016

(54) METHOD FOR OPERATING A MOTOR VEHICLE DURING FULLY AUTOMATIC VEHICLE GUIDANCE

(71) Applicant: Bayerische Motoren Werke Aktiengesellschaft, Munich (DE)

(72) Inventors: Dirk De Bruin, Allershausen (DE); Joachim Schiehlen, Germering (DE); Andreas Bogner, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/615,677

(22) Filed: Feb. 6, 2015

(65) Prior Publication Data

US 2015/0151757 A1    Jun. 4, 2015

Related U.S. Application Data

(63) Continuation of application No. PCT/EP2013/066240, filed on Aug. 1, 2013.

(30) Foreign Application Priority Data

Aug. 9, 2012   (DE) .................. 10 2012 214 208

(51) Int. Cl.
*B60W 10/18* (2012.01)
*B60W 30/16* (2012.01)
(Continued)

(52) U.S. Cl.
CPC ............. *B60W 30/162* (2013.01); *B60W 10/18* (2013.01); *B60W 10/20* (2013.01); *B60W 30/16* (2013.01); *G08G 1/163* (2013.01);
(Continued)

(58) Field of Classification Search
None
See application file for complete search history.

(56) References Cited

U.S. PATENT DOCUMENTS 6,161,074 A * 12/2000 Sielagoski ......... B60K 31/0008
180/167
2005/0015203 A1    1/2005 Nishira
(Continued)

FOREIGN PATENT DOCUMENTS

| DE | 101 59 658 A1 | 6/2003 |
|----|---------------|--------|
| DE | 10 2007 008 880 A1 | 10/2007 |
| DE | 10 2009 050 399 A1 | 5/2011 |

(Continued)

OTHER PUBLICATIONS

International Search Report dated Dec. 3, 2013 (Three (3) pages).
(Continued)

*Primary Examiner* — Thomas Tarcza
*Assistant Examiner* — Garrett Evans
(74) *Attorney, Agent, or Firm* — Crowell & Moring LLP

(57) ABSTRACT

A method for operating a motor vehicle using a control unit during operation of a fully-automatic driver assistance system is designed to guide the vehicle independently of the driver. The control unit actuates a drive unit and/or a brake unit during operation of said driver assistance system such that the motor vehicle maintains a predefined distance to a vehicle in front which is detected as a target object, the control unit also actuating the actuation unit of a steering system such that the motor vehicle is kept within its own detected lane. If the vehicle in front, detected as the target object, leaves the detected lane and if there is no new preceding vehicle, a braking action is performed.

19 Claims, 2 Drawing Sheets

(51) Int. Cl.
*G08G 1/16* (2006.01)
*B60W 10/20* (2006.01)

(52) U.S. Cl.
CPC ..... *B60W 2550/308* (2013.01); *B60W 2710/18* (2013.01); *B60W 2710/20* (2013.01)

(56) References Cited

U.S. PATENT DOCUMENTS

2008/0180281 A1  7/2008  Bilimoria et al.
2012/0283907 A1* 11/2012  Lee ................... B60T 8/17557
                                              701/31.9

FOREIGN PATENT DOCUMENTS

| DE | 10 2010 021 591 A1 | 12/2011 |
| EP | 1 699 033 A2 | 9/2006 |
| EP | 2 314 490 A1 | 4/2011 |
| WO | WO 2005/061265 A1 | 7/2005 |

OTHER PUBLICATIONS

German Search Report dated Apr. 22, 2013, with Statement of Relevancy (Five (5) pages).

* cited by examiner

METHOD FOR OPERATING A MOTOR VEHICLE DURING FULLY AUTOMATIC VEHICLE GUIDANCE

CROSS REFERENCE TO RELATED APPLICATIONS

This application is a continuation of PCT International Application No. PCT/EP2013/066240, filed Aug. 1, 2013, which claims priority under 35 U.S.C. §119 from German Patent Application No. 10 2012 214 208.8, filed Aug. 9, 2012, the entire disclosures of which are herein expressly incorporated by reference.

BACKGROUND AND SUMMARY OF THE INVENTION

The invention relates to a method for operating a motor vehicle during the operation of a fully automatic driver assistance system designed to guide the vehicle independently of the driver.

Various vehicle manufacturers are currently developing fully automatic systems designed to guide vehicles independently of drivers and which are intended to relieve drivers from driving workload during certain traffic situations by having the driving task performed fully automatically. One example would be traffic jam assistant, which can be used during traffic jam situations on highways. In this example, both longitudinal guidance (analogous to a distance-based or active cruise control) and transversal guidance for keeping the vehicle within the lane are performed automatically below a predefined speed limit of, for example, 60 km/h or 40 km/h. A particular embodiment of traffic jam assistants of this type would even permit the driver to remove his hands from the steering wheel for a certain period of time.

Fully automatic driver assistance systems designed for guiding the vehicle independently of the driver demand high safety requirements, since the occurrence of a fault would put both the driver and the other traffic participants at high risk.

A method for operating a driver assistance system of this type is already known from DE 10 2010 021 591 A1 in which a plausibility monitoring module continually checks whether a fault is present. Faults are defined as various situations such as, for example, the vehicle driving too fast or driving backwards, a specified minimum distance in relation to a vehicle ahead not being maintained and/or the vehicle leaving the lane. If such a fault is detected, a driving intervention serving to transfer the motor vehicle into a safer state is at least performed.

The invention seeks to solve the problem of providing a better method, with regard to detecting critical traffic situations and initiating appropriate measures, for operating a motor vehicle while a fully automatic driver assistance system designed for guiding the vehicle independently of the driver is operating.

Advantageous additional embodiments can be found in the subordinate claims.

In principle, the invention assumes a method for operating a motor vehicle while a fully automatic driver assistance system designed for guiding the vehicle independently of the driver is operating. Driver assistance systems of this type are designed such that they can actuate by means of one or more control units the actuation units of a (electrically powered) steering system and/or the actuation units of a drive system and/or a brake system when predefined basic conditions are present—e.g., when driving on a highway or at a speed below a predefined speed limit, such that the vehicle is guided or held within its detected driving lane and taking into consideration a vehicle ahead or a preceding vehicle detected as target object and any further traffic participants. In this case longitudinal guidance can be provided in the same manner as the longitudinal guidance of a distance-based cruise control (ACC).

The fundamental idea of the invention is now that in situations in which the vehicle's driving lane possibly ceases to exist or in situations in which a departure from the driving lane of the vehicle ahead is falsely recognized due to an incorrectly detected lane marking, intervention is made in the driver assistance system control such that no hazardous situations for the driver or other traffic participants can arise. To ensure that this requirement is met, the method according to the invention sets itself apart by the fact that a braking action is undertaken upon the vehicle ahead detected as a target object leaving the recognized own driving lane and there being no new preceding vehicle ahead. Through this measure, it can be ensured that if, for example, the own driving lane ends or an obstacle is present in the driving lane and is not detected that the vehicle will not leave the driving surface or collide with the obstacle as a result of a corresponding actuation of the drive unit.

In such situations a braking action is advantageously performed such that the vehicle comes to a standstill within a predefined time interval or within a predefined distance should the driver himself not resume the driving task or actively intervene in vehicle control during the braking procedure. To prevent a departure from the road or a collision with an obstacle, a braking action is performed such that the vehicle comes to a standstill within the distance existing between the motor vehicle and the vehicle ahead at the point in time at which the departure of the vehicle ahead detected as target object from the lane was detected, i.e. the motor vehicle will come to a stop no later than at the position where the target object ahead left the lane.

Because a braking action of this type is in principle required only if the driver is distracted at the time and does not recognize the possibly impending danger, the method according to the invention can be advantageously refined such that a corresponding braking action is performed only if upon the target object departing from the driving lane it is simultaneously detected that the driver is currently not resuming the driving task or is not able to do so immediately. This can in turn be detected or assumed if it is established that the driver is not touching the steering wheel, i.e. does not have his hands on the steering wheel.

To be able to alert the driver to this special situation, the driver is advantageously issued, simultaneously with the corresponding braking action, an optical, acoustical or haptic warning signal with a message prompting him to resume control of the vehicle. The warning can also be issued prior to the braking action if necessary.

With regard to transversal control of the vehicle following the detection of the departure from the recognized driving lane of the target object, various measures can be taken. According to a first alternative, the steering actuator units of the steering system can be actuated such that the vehicle continues to be guided along a transversal control requirement or transversal control trajectory determined or required on the basis of the fully automatic driver assistance system designed to guide the vehicle independently of the driver, i.e. the vehicle continues to be held within the lane or in the center of the lane. Alternatively, according to an advantageous refinement of the invention, the steering actuator units of the steering system can be actuated such that the vehicle, upon detection of the target object ahead leaving its own driving lane, is guided alone a newly determined transversal control fallback trajectory. For example, it could be expedient in this case to bring the vehicle to a standstill at the right or left edge of its own driving lane.

The invention is described again in greater detail on the basis of the exemplary embodiment presented below. Illustrated are other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
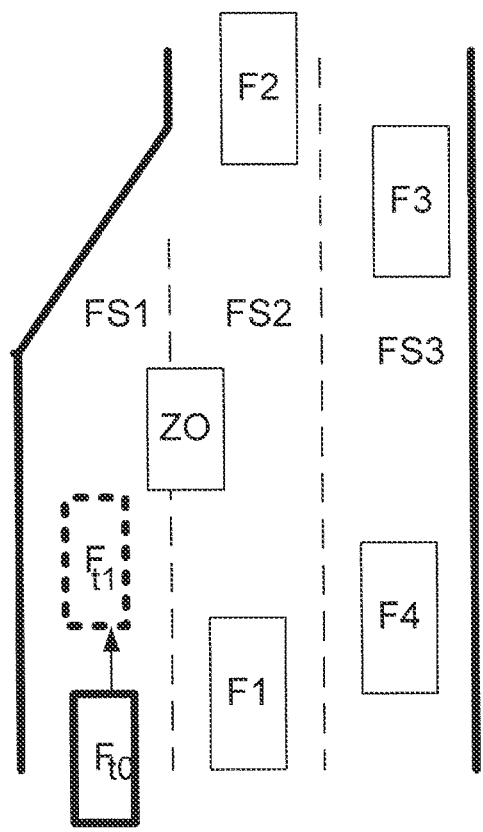
FIG. 1 is a first traffic situation in which the inventive method can be used.

FIG. 1 shows a traffic jam situation on a highway with 3 lanes, FS1, FS2 and FS3, the left lane FS2 ending and merging into the center lane FS2.

Vehicles F1, F2, F3 and F4 are present on the right and center lanes FS3 and FS2, while present on the left lane FS1 is the vehicle F equipped with a so-called traffic jam assistant as well as a vehicle ahead detected (for example by means of a camera or radar unit) as a target object ZO. Because the traffic jam assistant is active, both the longitudinal and transversal guidance of vehicle F are performed fully automatically, namely in such a manner that the vehicle is guided within driving lane FS1 at a predefined distance to the detected target object. At the point in time t0, the vehicle F equipped with the traffic jam assistant is located at the position labeled Ft0. At this point in time, it is detected that the (original) target object is leaving the lane, i.e. vanishing as target object, and simultaneously no new preceding vehicle is detected or can be designated as target object. According to the invention, the traffic jam assistant now modifies the vehicle guidance system such that the vehicle F, by means of appropriate transversal guidance and an appropriate braking action, comes to a standstill within the driving lane at the distance at which the target object ZO left the lane (see Ft1). This ensures that although the vehicle continues to drive within this left lane FS1, braking is applied until the vehicle comes to a standstill because of the situation which is implausible for the driver assistance system. The same would also occur in a roundabout traffic situation in which the target object would enter the roundabout traffic and thus no longer be available as target object.

Figure 2:
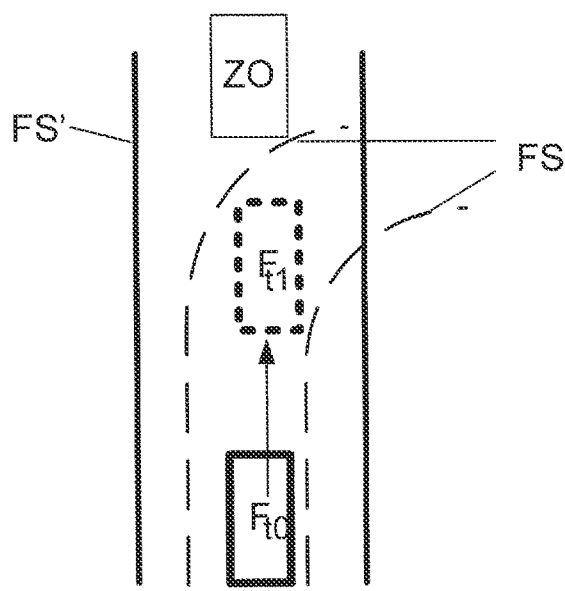
FIG. 2 is a second traffic situation in which the inventive method can be used.

FIG. 2 shows another traffic jam situation in which the vehicle F equipped with the traffic jam assistant would perceive the lane FS as curving due to faulty sensors even though the actual driving lane FS' does not curve. Because the target object would not follow the driving lane FS incorrectly detected by the traffic jam assistant, a departure from this "incorrect" driving lane FS by the target object ZO is detected at the point in time t0. Additionally, the vehicle would also not detect a new vehicle ahead, since the incorrectly perceived driving lane course FS does not exist. Because of this situation, the traffic jam assistant would intervene in vehicle guidance such that the vehicle F comes to a standstill at position t1 where the target object ZO was detected leaving the recognized driving lane FS, since it would otherwise result in an implausible situation for the system.

Figure 3:
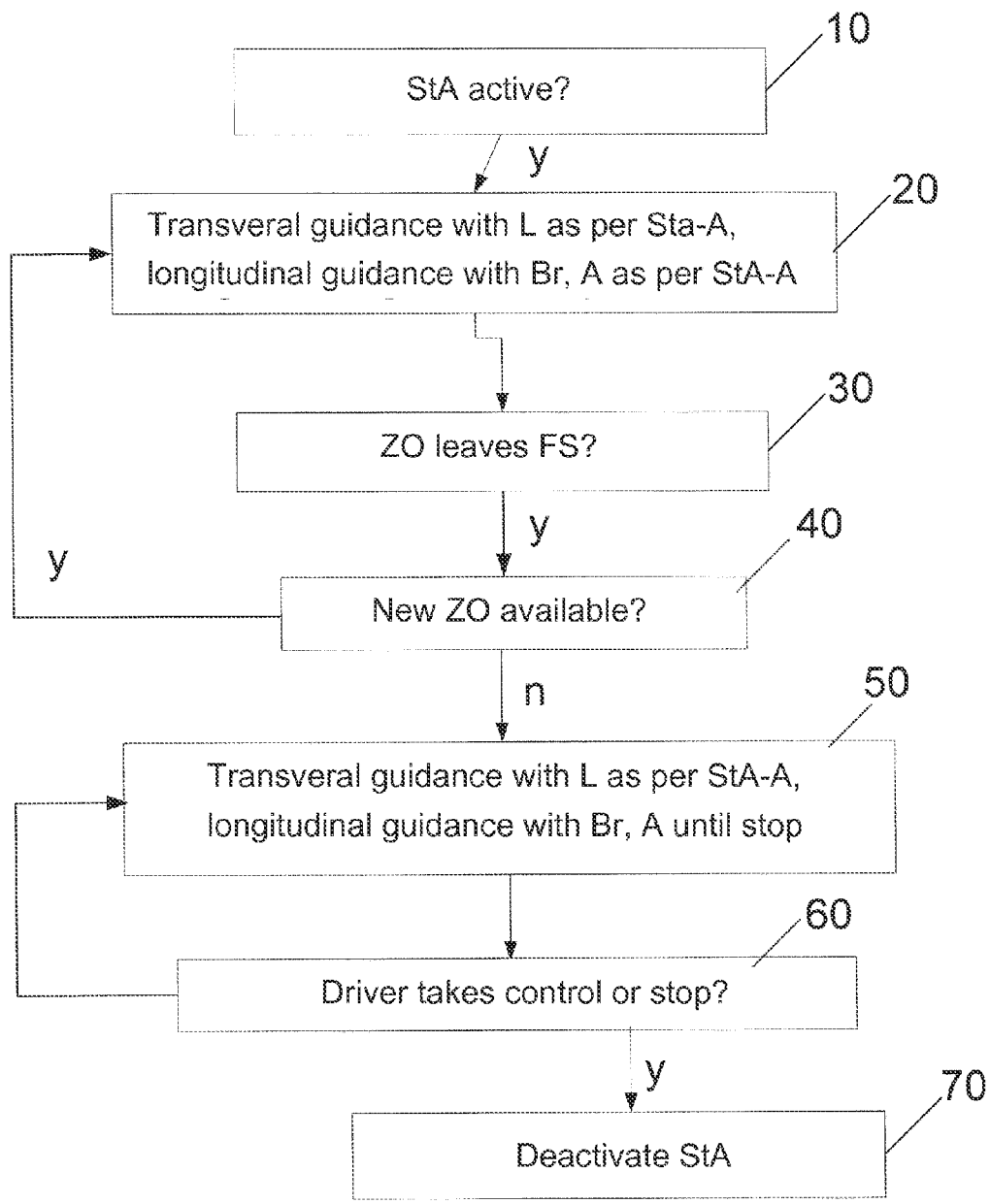
FIG. 3 is a simplified flowchart illustrating an advantageous embodiment of the inventive method. This method can be implemented within a control unit or distributed over multiple control units provided for this purpose.

The flowchart shown in FIG. 3 illustrating a possible embodiment of the method according to the invention starts at step 10 as soon as the fully automatic driver assistance system realized as traffic jam assistant StA and designed for guiding the vehicle independently of the driver is operating. If this is the case, a steering actuator L, which can be designed as an electrically powered steering system, is (in step 20) continuously actuated for motor vehicle transversal guidance according to the requirements of the traffic assistant StA-A for lane retention, i.e. there is regulation of transversal guidance q. Simultaneously, the braking system Br and drive system A are actuated according to the requirements of the traffic jam assistant StA-A for longitudinal guidance of the motor vehicle. Longitudinal guidance can be performed in the same manner as the longitudinal guidance of a distance-based cruise control system.

Additionally, it is continuously checked in step 30 whether the target object is leaving its recognized own driving lane F2 and thus vanishing as control object. If the departure of the target object ZO from the driving lane FS is detected, the next step 40 checks whether a new target object ZO can be recognized on the driving lane. If this is the case, the process returns to step 20 and corresponding vehicle guidance is undertaken on the basis of the new target object.

If, however, no new target object is detected, then a takeover prompt UA for resuming vehicle guidance is issued to the driver in the form of an acoustical, haptic and/or optical alert in step 50. While distance control can be no longer be performed due to there being no new target object, the transversal guidance continues to be performed by means of appropriate activation of the steering system on the basis of the transversal guidance requirement StA-A of the traffic jam assistant StA, i.e. the transversal guidance requirement of StA-A or the transversal guidance trajectory remains unchanged. In contrast, longitudinal control is modified such that the vehicle is brought to a standstill through an appropriate braking action by means of the brake Br.

Simultaneous with or following the start of these transversal guidance and longitudinal guidance measures being initiated, a next step 60 checks whether the driver has resumed the driving task himself or the vehicle has already come to a standstill. If none of these two conditions is satisfied (yet), the process returns to step 50 and the appropriate control is continued.

If it is detected, however, that the driver has resumed the driving task himself or the vehicle has come to a standstill, the traffic jam assistant StA is deactivated and the process is thus ended. Alternatively, this does not necessarily have to result in a deactivation. If, for example, driving lanes are detected again in the meantime, and the driver has his hands on the steering wheel, then transversal guidance can remain active.

The method described here allows it to be ensured in a simple and cost-effective manner that the vehicle is automatically brought to a safe condition or to a standstill and that thereby no danger is posed to the driver or other traffic participants when traffic jam assistant is active and critical or not clearly discernable traffic situations arise.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for effecting an automatic driver assistance of a user vehicle having a control unit configured to control a drive unit, a brake unit and a steering system of the user vehicle independently of the driver, the method comprising:
controlling the drive unit and/or the brake unit, via the control unit, to maintain a prescribed distance between the user vehicle and a detected target vehicle ahead, and controlling the steering system, via the control unit, to maintain the motor vehicle within a detected lane,
detecting whether the target vehicle leaves the detected lane and whether a preceding target vehicle is not present in the detected lane; and
controlling the brake unit, via the control unit, to execute a braking action in the event it is detected that the target vehicle leaves the detected lane and that the preceding target vehicle is not present in the detected lane.

2. The method according to claim 1, wherein the braking action is executed such that the user vehicle comes to a standstill within a predefined time interval or within a predefined distance.

3. The method according to claim 1, wherein the braking action is executed such that the user vehicle comes to a standstill within a distance that existed between the user vehicle and the target vehicle at a point in time at which the target vehicle was detected leaving the detected lane.

4. The method according to claim 2, wherein the braking action is executed such that the user vehicle comes to a standstill within a distance that existed between the user vehicle and the target vehicle at a point in time at which the target vehicle was detected leaving the detected lane.

5. The method according to claim 1, further comprising:
issuing a warning to the driver, the warning indicating that it is detected that the target vehicle leaves the detected lane and that the preceding target vehicle is not present in the detected lane.

6. The method according to claim 2, further comprising:
issuing a warning to the driver, the warning indicating that it is detected that the target vehicle leaves the detected lane and that the preceding target vehicle is not present in the detected lane.

7. The method according to claim 3, further comprising:
issuing a warning to the driver, the warning indicating that it is detected that the target vehicle leaves the detected lane and that the preceding target vehicle is not present in the detected lane.

8. The method according to claim 1, further comprising:
simultaneously detecting whether the driver is touching the steering wheel,
wherein the braking action is only executed if it is simultaneously detected that the driver is not touching the steering wheel.

9. The method according to claim 2, further comprising:
simultaneously detecting whether the driver is touching the steering wheel,
wherein the braking action is only executed if it is simultaneously detected that the driver is not touching the steering wheel.

10. The method according to claim 3, further comprising:
simultaneously detecting whether the driver is touching the steering wheel,
wherein the braking action is only executed if it is simultaneously detected that the driver is not touching the steering wheel.

11. The method according to claim 5, further comprising:
simultaneously detecting whether the driver is touching the steering wheel,
wherein the braking action is only executed if it is simultaneously detected that the driver is not touching the steering wheel.

12. The method according to claim 1, further comprising:
determining a transversal control requirement and/or a transversal control trajectory; and
controlling a steering actuator unit of the steering system to guide the user vehicle along the determined transversal control requirement and/or transversal control trajectory independently of driver.

13. The method according to claim 2, further comprising:
determining a transversal control requirement and/or a transversal control trajectory; and
controlling a steering actuator unit of the steering system to guide the user vehicle along the determined transversal control requirement and/or transversal control trajectory independently of driver.

14. The method according to claim 3, further comprising:
determining a transversal control requirement and/or a transversal control trajectory; and
controlling a steering actuator unit of the steering system to guide the user vehicle along the determined transversal control requirement and/or transversal control trajectory independently of driver.

15. The method according to claim 5, further comprising:
determining a transversal control requirement and/or a transversal control trajectory; and
controlling a steering actuator unit of the steering system to guide the user vehicle along the determined transversal control requirement and/or transversal control trajectory independently of driver.

16. The method according to claim 8, further comprising:
determining a transversal control requirement and/or a transversal control trajectory; and
controlling a steering actuator unit of the steering system to guide the user vehicle along the determined transversal control requirement and/or transversal control trajectory independently of driver.

17. A method for operating a motor vehicle, by a control unit, during operation of a fully automatic driver assistance system configured to guide the vehicle independently of the driver, the method comprising the acts of:
detecting, by the control unit, a target vehicle traveling in the motor vehicle's own detected lane and ahead of the motor vehicle;
actuating, by the control unit, at least one of a drive unit and a brake unit during the operation of said driver assistance system in order to maintain a prescribed distance between the vehicle and the target vehicle;
actuating an actuation unit of a steering system in order to keep the motor vehicle within the detected lane; and
performing a braking action if the target vehicle is detected as leaving said detected lane and no preceding vehicle is detected as being present.

18. The method according to claim 17, further comprising:
simultaneously detecting whether the driver is unable to assume a driving task;
wherein the braking action is performed if it is simultaneously detected that the driver is unable to assume the driving task.

19. The method according to claim 18, wherein it is detected that the driver is unable to assume the driving task when it is detected that the driver is not touching the steering wheel.

* * * * *